(12) United States Patent
Muthukumarasamy (10) Patent No.: US 9,262,330 B2
(45) Date of Patent: Feb. 16, 2016

(54) COLUMN ORIENTED IN-MEMORY PAGE CACHING

(75) Inventor: Devarajan Kaladipet Muthukumarasamy, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1028 days.

(21) Appl. No.: 12/612,325

(22) Filed: Nov. 4, 2009

(65) Prior Publication Data

US 2011/0107021 A1 May 5, 2011

(51) Int. Cl.
*G06F 17/30* (2006.01)
*G06F 12/08* (2006.01)
*G06F 12/02* (2006.01)

(52) U.S. Cl.
CPC ........ *G06F 12/0882* (2013.01); *G06F 12/0207* (2013.01); *G06F 17/30315* (2013.01)

(58) Field of Classification Search
CPC ......................... G06F 17/30–17/30997; G06F 17/30286–17/30607
USPC .......... 711/118, 170; 707/713, 715, 736, 737, 707/752, 756, 801
See application file for complete search history.

(56) References Cited

U.S. PATENT DOCUMENTS

| | | | | |
|---|---|---|---|---|
| 5,794,229 | A * | 8/1998 | French et al. | 1/1 |
| 5,845,296 | A * | 12/1998 | Jasuja et al. | 1/1 |
| 6,154,813 | A * | 11/2000 | Martin et al. | 711/133 |
| 6,941,310 | B2 | 9/2005 | Ahad et al. | |
| 7,024,414 | B2 | 4/2006 | Sah et al. | |
| 7,231,593 | B1 * | 6/2007 | Raja et al. | 715/210 |
| 2005/0071308 | A1 * | 3/2005 | Wedel et al. | 707/1 |
| 2005/0149346 | A1 * | 7/2005 | Arnold et al. | 705/1 |
| 2010/0030796 | A1 | 2/2010 | Netz et al. | |
| 2010/0223606 | A1 * | 9/2010 | Park et al. | 717/166 |

OTHER PUBLICATIONS

Daniel Abadi, "Query Exection in Column-Oriented Database Systems", Feb. 2008, Thesis—MIT Dept. of Electrical Engineering and Computer Science, pp. 39-45.*
Coffey, Neil, "How to calculate the memory usage of a Java array," http://web.archive.org/web/20090127022559/http://javamex.com/tutorials/memory/array_memory_usage.shtml, Jan. 27, 2009, Retrieved Mar. 14, 2013.*
O'Reilly & Associates, "Array Types (Java in a Nutshell)", archived Jan. 20, 2009, http://docstore.mik.ua/orelly/java-ent/jnut/ch02_09.htm, Retrieved Sep. 3, 2014 from http://archive.org.*
Abadi et al.; "Integrating Compression and Execution in Column-Oriented Database Systems," Jun. 27-29, 2006, SIGMOD 2006, 12 pages.

(Continued)

*Primary Examiner* — Aimee Li
*Assistant Examiner* — Nicholas Simonetti
(74) *Attorney, Agent, or Firm* — Henry Gabryjelski; Kate Drakos; Micky Minhas (57) ABSTRACT

A one-dimensional array is allocated in an in-memory cache for each column in a set of tabular data. The data type of each one-dimensional array is set to be the same as the data type of the corresponding column in the tabular data. Once the one-dimensional arrays have been allocated in memory, a portion of the data from each column in the tabular data is stored in a corresponding one-dimensional array. The tabular data stored in the one-dimensional arrays in the cache may then be utilized to generate an on-screen display of a portion of the tabular data.

16 Claims, 4 Drawing Sheets

(56) References Cited

OTHER PUBLICATIONS

Abadi et al.; "Materialization Strategies in a Column-Oriented DBMS," Apr. 2007, IEEE 23$^{rd}$ International Conference on Data Engineering, 11 pages.

Abadi, D., "A Tour Through Hybrid Column/Row-Oriented DBMS Schemes," Sep. 3, 2009, downloaded from http:dbmsmusings.blogspot.com/2009/09/tour-through-hybrid-columnrow-oriented.htm, 9 pages.

Loshin, D., "Gaining the Performance Edge Using a Column-Oriented Database Management System," 2009, Whitepaper, downloaded from http://www.caci.com/Contracts/ITES/GainingthePerformanceEdge_Sybase.pdf, 12 pages.

Schaffner et al., "A Hybrid Row-Column OLTP Database Architecture for Operational Reporting," Aug. 3, 2009, Lecture Notes in Business Information Processing, vol. 67, pp. 61-74.

Venkat, K. et al., "Column Oriented Databases vs. Row Oriented Databases," Nov. 19, 2007, downloaded from www.itk.ilstu.edu/faculty/bllim/acs478/.../SIA%20Rakesh%20Venkata.doc, 35 pages.

\* cited by examiner

COLUMN ORIENTED IN-MEMORY PAGE CACHING

BACKGROUND

Traditional software mechanisms for caching tabular data in memory typically store the tabular data in a two-dimensional array. In particular, a collection of two-dimensional arrays is frequently utilized to store a portion of the rows and columns of the tabular data in memory. In such an implementation, a page might contain one or more two-dimensional arrays. A page cache is utilized to store a collection of pages. This process is commonly referred to as tabular page caching.

Tabular page caching suffers from a number of serious drawbacks, especially when utilized in conjunction with tabular data that has millions, hundreds of millions, or even billions of rows. For instance, traditional tabular page caching implementations require the conversion of all columns in a cached two-dimensional array into a common data type prior to storage in the cache since data of different types cannot be stored in a single two-dimensional array. The data stored in the cache must also be converted back to its original data type when the data is retrieved from the cache. The data type conversion of all of the columns in a very large tabular data set in this manner might significantly impact performance. Performance might also be degraded in previous implementations when columns are re-ordered by a user.

It is with respect to these and other considerations that the disclosure made herein is presented.

SUMMARY

Concepts and technologies are described herein for column oriented in-memory page caching. Through an implementation of the concepts and technologies presented herein, tabular data can be cached in a manner that does not require conversion of the tabular data into a common data type prior to storage in the cache or conversion of data stored in the cache to an original data type when the data is retrieved from the cache. Moreover, through an implementation of the concepts presented herein, columns may be reordered in the tabular data without a significant performance impact as felt in previous tabular page caching solutions. In this way, a large amount of tabular data, potentially billions of rows, can be interacted with and displayed in a performant manner.

According to one aspect presented herein, a data analysis add-in program is provided for use in conjunction with a spreadsheet application program. The data analysis add-in program provides functionality for performing calculations on large data sets, such as large sets of tabular data. The data analysis add-in program also provides functionality for displaying the tabular data. In one embodiment disclosed herein, the data analysis add-in program retrieves the tabular data from an in-process data analysis server executing in process with the spreadsheet application program.

In order to display a large amount of tabular data in a performant manner, the data analysis add-in program utilizes column-oriented page caching. In particular, the data analysis add-in program maintains a cache in random access memory ("RAM"), referred to herein as the column-oriented page cache or, simply, the "cache". The column-oriented page cache is utilized to cache a portion of the tabular data for display.

According to one implementation, the data analysis add-in program receives tabular data from the in-process data analysis server. As known in the art, tabular data is data that is formatted in rows and columns. The data analysis add-in program allocates a one-dimensional array in the cache for each column of the tabular data. Each one-dimensional array may be allocated to store only a portion of the rows within each column of the tabular data. For instance, if the tabular data contains 50 columns by one million rows, the data analysis add-in might allocate 50 one-dimensional arrays having only 25 elements contained therein. As will be discussed below, if additional tabular data needs to be cached, additional one-dimensional arrays will be created in the cache for caching the additional data.

According to one implementation, the data analysis add-in program sets the data type of each one-dimensional array to the same data type as the corresponding column in the tabular data. By setting the data type of the one-dimensional array the same as the column in the tabular data from which the array will store data, the need for converting between data types as in previous solutions is eliminated.

Once the data analysis add-in program has allocated the one-dimensional arrays, the data analysis add-in program stores a portion of the data from each column in the tabular data in the corresponding one-dimensional arrays. The data analysis add-in program may then utilize the tabular data stored in the one-dimensional arrays to generate an on-screen display of the tabular data.

According to one implementation, the one-dimensional arrays are organized into pages. One page represents the one-dimensional arrays necessary to generate a single on-screen display of a portion of the tabular data. If a first portion of the tabular data is cached and displayed and a user subsequently requests to view another portion of the tabular data, the data analysis add-in program might first determine whether sufficient RAM exists to cache more pages.

If sufficient RAM does not exist, one or more previously cached pages might be flushed, thereby freeing up RAM to cache additional pages. In order to cache and display the newly requested portion of the tabular data set, the data analysis add-in program allocates one-dimensional arrays for the requested portion, copies at least the requested portion of the tabular data to the one-dimensional arrays, and displays the requested portion of the tabular data using the cached data. This process might be repeated as a user makes additional requests to view other portions of the tabular data.

It should be appreciated that although the concepts and technologies for column oriented in-memory page caching presented herein have been described in the context of a data analysis add-in program and an in-process data analysis server, these concepts and technologies may be utilized with any type of program module for processing tabular data. It should also be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for column oriented in-memory page caching. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for column oriented in-memory page caching will be presented.

Figure 1:
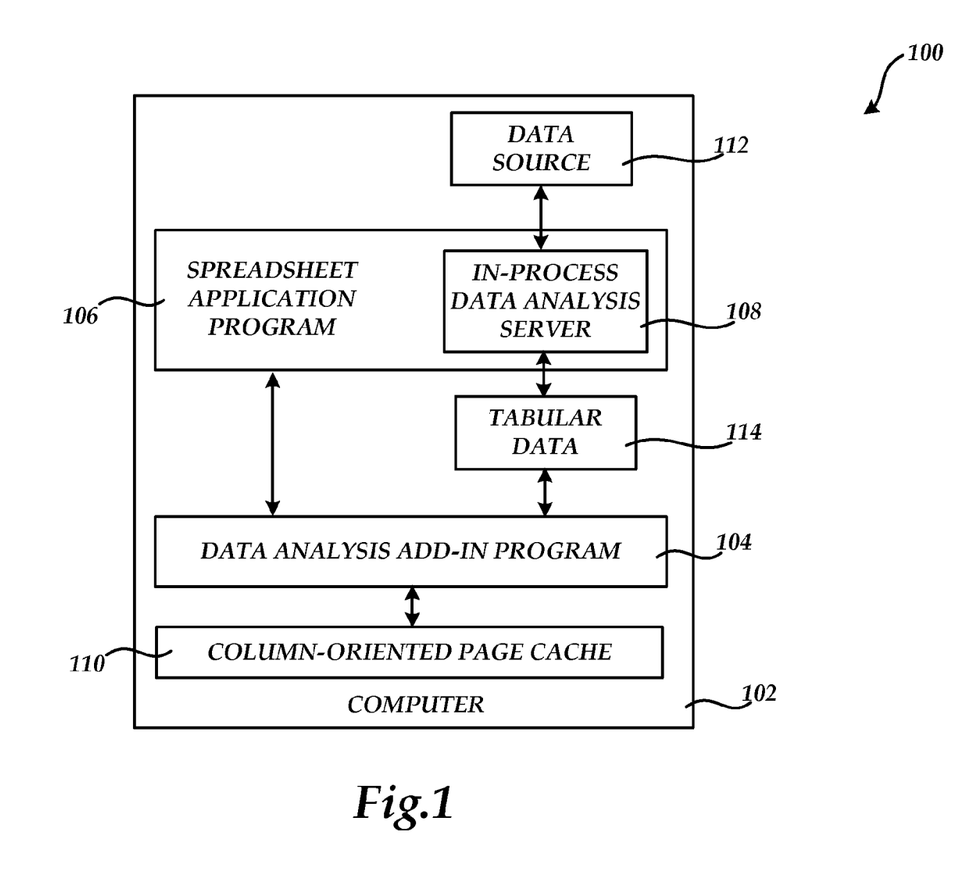
FIG. 1 is a system diagram illustrating an operating environment for the various embodiments disclosed herein.

Referring now to FIG. 1, aspects of one operating environment 100 for the various embodiments presented herein and several software components presented herein will be described. The operating environment 100 shown in FIG. 1 includes a computer 102 configured to execute a spreadsheet application program 106. The computer 102 may comprise a standard desktop or laptop personal computer system. Alternatively, the computer 102 may comprise a server computer, a hand held computer, an embedded computer system, a personal digital assistant, or virtually any other type of computing device known to those skilled in the art that is capable of executing a spreadsheet application program 106.

According to one embodiment, the computer 102 is configured to execute a data analysis add-in program 104. The data analysis add-in program 104 is an add-in program module for use with the spreadsheet application program 106 that provides functionality for performing calculations on large data sets, such as large sets of tabular data 114. As will be described in greater detail below, the data analysis add-in program 104 also provides functionality for displaying the tabular data 114.

In one implementation, the data analysis add-in program 104 operates in conjunction with an in-process data analysis server 108. The in-process data analysis server 108 provides functionality for retrieving data from one or more data sources, such as the data source 112. The data sources 112 might be provided by the computer 102 or provided by another computer system communicatively coupled to the computer 102, such as by way of a data communications network. In one embodiment, the in-process data analysis server 108 executes in process with the spreadsheet application program 106.

The in-process data analysis server 108 is configured in one embodiment to provide data retrieved from one or more data sources, such as the data source 112, to the data analysis add-in program 104 in the form of tabular data 114. As known in the art, tabular data is data that is formatted in rows and columns. Each column of the tabular data 114 may have an associated data type. For instance, one column of data might have an integer data type while another column of data has a string data type. Additionally, according to embodiments, the tabular data 114 might have millions, hundreds of millions, or even billions of rows.

According to one embodiment, the data analysis add-in program 104 is configured to provide a user interface for allowing a user to view and interact with the tabular data 114. For instance, the data analysis add-in program 104 might cause a grid to be displayed on a display (not shown) of the computer 102 that includes the tabular data 114. Functionality might also be provided for allowing a user to navigate around the tabular data 114, one portion at a time. Each portion of the tabular data 114 displayed by the data analysis add-in program 104 at a time might be limited by the resolution of the connected display. For instance, only 20 columns by 50 rows of the tabular data 114 might be displayed at any given time. Appropriate user interface controls may be provided for allowing a user to navigate to other portions of the tabular data 114.

In order to provide a display of the tabular data 114 in a performant fashion, the data analysis add-in program 104 creates and utilizes a column-oriented page cache 102, the "cache", for caching portions of the tabular data 114. The data analysis add-in program 104 utilizes the tabular data 114 stored in the cache 110 to create the on-screen display of the tabular data 110.

As will be described in greater detail below, the data analysis add-in program 104 maintains the cache 110 in a volatile memory of the computer 102, such as a RAM. Additionally, the data analysis add-in program 104 maintains the cache 110 in a format that allows quick storage and retrieval of portions of the tabular data 114 in the cache 110, that does not require conversion of the data type of the tabular data 114 prior to storage in the cache 110 or upon retrieval of data from the cache 110, and that allows columns of the tabular data 114 to be rearranged without a significant performance penalty. Additional details regarding the use of the column-oriented page cache 110 for providing a display of the tabular data 114 will be provided below with respect to FIGS. 2-4.

Figure 2:
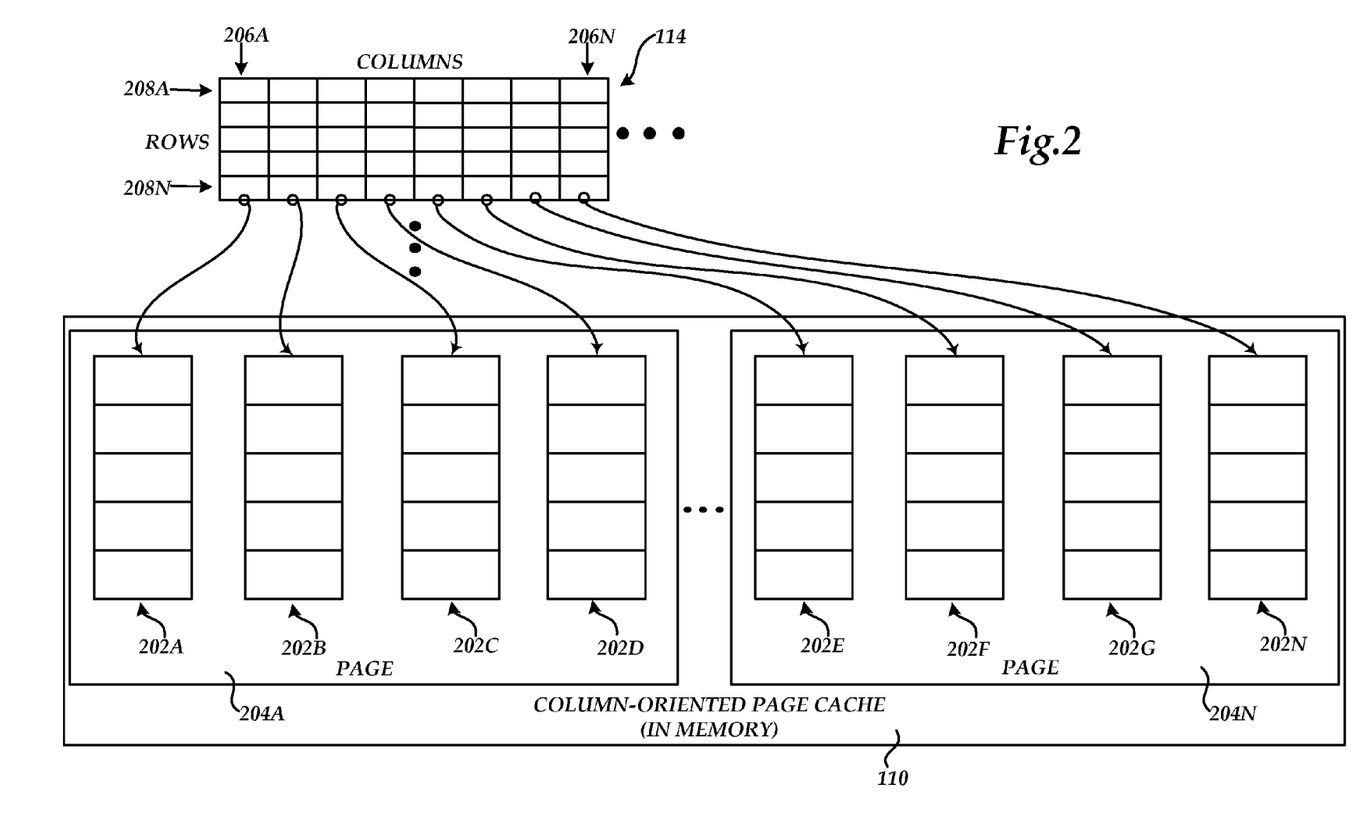
FIG. 2 is a data structure diagram illustrating aspects of a column-oriented page cache disclosed in the embodiments presented herein.

FIG. 2 is a data structure diagram illustrating aspects of a column-oriented page cache 110 disclosed in the embodiments presented herein. As shown in FIG. 2, the cache 110 is stored in memory and consists of one or more one-dimensional arrays 202A-202N. Each of the one-dimensional arrays 202A-202N corresponds to a row 206A-206N of the tabular data 114. Two or more of the one-dimensional arrays 202A-202N may correspond to the same column 206 of the tabular data 114, but contain data from different rows 208A-208N of the tabular data 114.

As discussed briefly above, the data analysis add-in program 104 receives the tabular data 114 from the in-process data analysis server 108. In response thereto, the data analysis add-in program 104 allocates a one-dimensional array 202A-202N in the cache 110 for each column 206A-206N of the tabular data 114. In an embodiment, the data analysis add-in program 104 allocates a one-dimensional array 202A-202N in the cache for less than all of the columns 206A-206N of the tabular data 114. One-dimensional arrays 202A-202N may be allocated subsequently for other columns 206A-206N.

Each of the one-dimensional arrays 202A-202N may be allocated to store only a portion of the rows 208A-208N within each column 206A-206N of the tabular data 114. For instance, if the tabular data 114 contains 50 columns 206A-206N and one million rows 208A-208N, the data analysis add-in program 104 might allocate 50 one-dimensional arrays 202A-202N having only 25 rows contained therein. As will be discussed below, if additional portions of the tabular data 114 need to be cached for display, additional one-dimensional arrays 202 will be created in the cache 110 for caching the additional data.

According to one implementation, the data analysis add-in program 104 sets the data type of each of the one-dimensional arrays 202A-202N to the same data type as the corresponding column 206A-206N in the tabular data 114. For instance, if the data type of the row 206A is integer, the data type of the corresponding one-dimensional array 202A will also be set to integer. If the data type of the row 206B is string, the data type of the corresponding one-dimensional array 202B will also be set to string. By setting the data type of the one-dimensional arrays 202A-202N to be the same data type as the corresponding column 206A-206N in the tabular data 114 from which each array will receive data, the need for converting between data types as in previous solutions is eliminated.

Once the data analysis add-in program 104 has created the one-dimensional arrays 202A-202N, the data analysis add-in program 104 stores a portion of the data from each column 206A-206N of the tabular data 114 in the corresponding one-dimensional arrays 202A-202N. The data analysis add-in program 104 may then utilize the tabular data 114 stored in the one-dimensional arrays 202A-202N to generate an on-screen display of at least a portion of the tabular data 114.

According to one implementation, the one-dimensional arrays 202A-202N are organized into pages 204A-204N. In one embodiment, one page, such as the page 204A, represents the one-dimensional arrays 202A-202N necessary to generate a single on-screen display of a portion of the tabular data 114. For instance, the page 204A includes the one-dimensional arrays 202A-202D. The page 204N includes the one-dimensional arrays 202E-202N. Although eight one-dimensional arrays 202A-202N and two pages 204A-204N have been illustrated in FIG. 2, it should be appreciated that more or fewer arrays 202A-202N and pages 204A-204N may be allocated at any given time.

If a first portion of the tabular data 114 is cached and displayed and a user subsequently requests to view another portion of the tabular data 114, the data analysis add-in program 104 might first determine whether sufficient RAM exists to cache additional pages 204. If sufficient RAM does not exist, one or more previously cached pages 204 might be flushed, thereby freeing up RAM to cache additional pages 204. In order to cache and display the newly requested portion of the tabular data 114, the data analysis add-in program 104 allocates one-dimensional arrays 202 for the requested portion of the tabular data 114, copies at least the requested portion of the tabular data 114 to the newly allocated one-dimensional arrays 202, and displays the requested portion of the tabular data 114 using the contents of the cache 110. This process might be repeated as a user makes additional requests to view other portions of the tabular data 114. Additional details regarding the process of creating and utilizing the contents of the cache 110 to display the tabular data 114 will be provided below with respect to FIG. 3.

Figure 3:
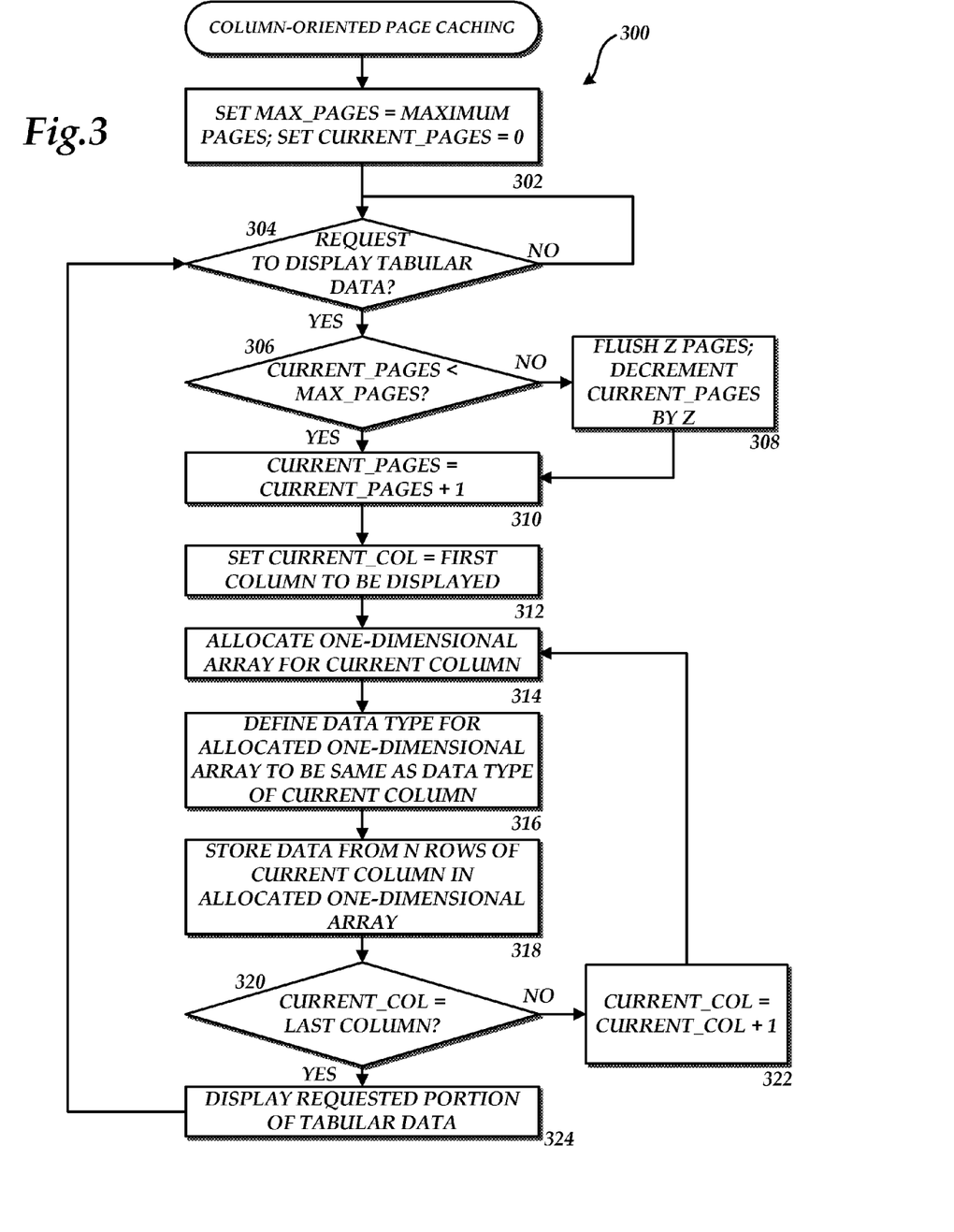
FIG. 3 is a flow diagram showing a process that illustrates the creation and use of a column-oriented page cache provided herein.

Referring now to FIG. 3 additional details will be provided regarding the embodiments presented herein for column-oriented page caching. In particular, FIG. 3 is a flow diagram showing one exemplary routine 300 that illustrates aspects of a process presented for column oriented in-memory page caching in one embodiment disclosed herein. It should be appreciated that the logical operations described herein with respect to FIG. 3 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the data analysis add-in program 104 initializes several variables for use in the column-oriented page caching process. In particular, a "Max_Pages" variable is initialized that indicates the maximum number of pages 204 of one-dimensional arrays 202 that should be maintained at any given time. The value of the Max_Pages variable may be a function of the available memory of the computer 102. A "Current_Pages" variable is also initialized that indicates the number of pages 204 that have currently been allocated. The Current_Pages variable is initially set to zero. Once these variables have been initialized, the routine 300 proceeds to operation 304.

At operation 304, a determination is made as to whether a request has been received to display a portion of the tabular data 114. Such a request may be generated when the tabular data 114 is first displayed or by a user requesting to view a currently off-screen portion of the tabular data 114. As discussed above, the data analysis add-in program 104 may provide appropriate user interface controls for allowing a user to navigate a portion of the tabular data 114 on screen. If a request to view a portion of the tabular data 114 is not received at operation 304, the routine 300 proceeds to operation 304, where another such determination is made. If a request to view a portion of the tabular data 114 is received, the routine 300 proceeds from operation 304 to operation 306.

At operation 306, the data analysis add-in program 104 determines whether the value of the Current_Pages variable is less than the value of the Max_Pages variable. In this manner, the data analysis add-in program 104 determines whether the maximum number of pages 204 has been allocated. If the maximum number of pages 204 has been allocated, the routine 300 proceeds from operation 306 to operation 308 where a number, in one embodiment an integer Z, of pages 204 are flushed from memory. The particular pages 204 to be flushed may be based upon the time of last access of the pages or other factors. At operation 308, the Current_Pages variable is also decremented by Z, to thereby reflect the fact that Z pages 204 have been flushed from the cache 110. From operation 308, the routine 300 proceeds to operation 310.

If, at operation 306, the data analysis add-in program 104 determines that the maximum number of pages 204 has not been allocated, the routine 300 proceeds from operation 306 to operation 310. At operation 310, the Current_Pages variable is incremented to indicate that a new page is about to be allocated. The routine 300 then proceeds to operation 312.

At operation 312, the data analysis add-in program 104 initializes another variable, referred to herein as "Current_Col". The Current_Col variable indicates the current column 206 of the tabular data 114 that is being processed. The Current_Col variable is initialized to the value of the first column 206 of the tabular data 114 that is to be stored in the cache 110. Once the Current_Col variable has been initialized at operation 312, the routine 300 proceeds to operation 314.

At operation 314, the data analysis add-in program 104 allocates a one-dimensional array 202 for storing data from the column 206 of the tabular data 114 specified by the Current_Col variable. As described briefly above, the allocated one-dimensional array may store all or a portion of the data in the rows 208A-208N in the column 206 specified by the Current_Col variable.

Once the one-dimensional array has been allocated at operation 314, the routine 300 proceeds to operation 316 where the data type of the allocated one-dimensional array is set to be the same as the data type of the corresponding column in the tabular data 114. As mentioned above, for instance, if the data type of the row 206A is integer, the data type of the corresponding one-dimensional array 202A will also be set to integer. If the data type of the row 206B is string, the data type of the corresponding one-dimensional array 202B will also be set to string. Once the data type of the allocated one-dimensional array 202 has been set at operation 316, the routine 300 proceeds to operation 318.

At operation 318, data from a number of rows 208A-208N, referred to herein as an arbitrary integer N, of the column identified by the Current_Col variable are stored in the allocated one-dimensional array. For instance, in the example shown in FIG. 2, data from N of the rows 208A-208N might be stored in the array 202A. Once the data from the tabular data 114 has been stored, the routine 300 proceeds to operation 320.

At operation 320, the data analysis add-in program 104 determines whether the current column, as indicated by the value of the Current_Col variable, is the last column 206N of the tabular data 114. If not, the routine 300 proceeds to operation 322, where the value of the Current_Col variable is incremented to indicate that the next column of the tabular data 114 should be processed. From operation 322, the routine 300 proceeds to operation 314, where the next column of the tabular data 114 is processed in a similar manner.

If, at operation 320, the data analysis add-in program 104 determines that the last column of the tabular data 114 has been stored in the cache 110, the routine 300 proceeds to operation 304, where another request to view a different portion of the tabular data 114 may be processed in a manner similar to that described above.

Figure 4:
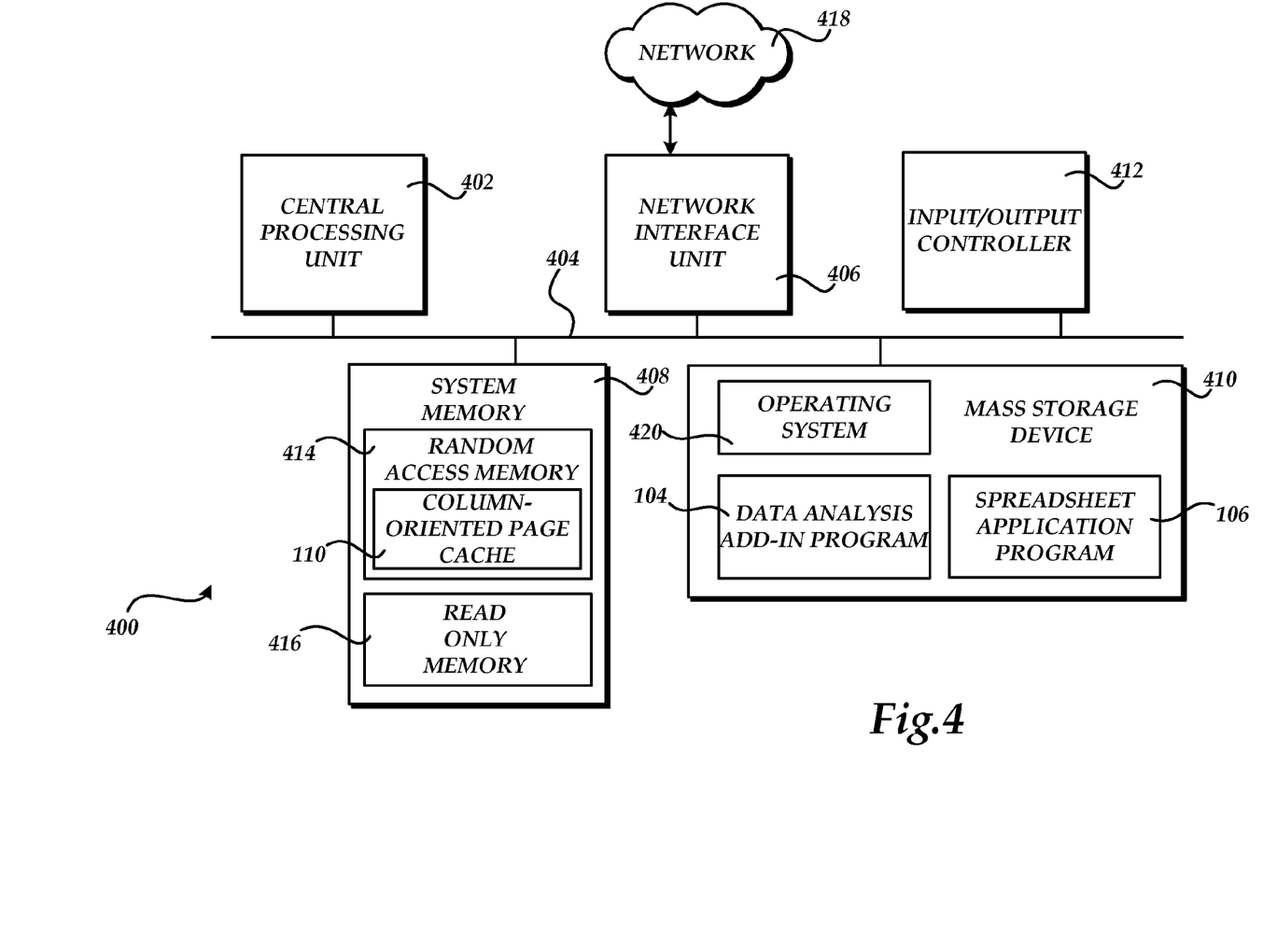
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein for column oriented in-memory page caching the manner presented above. The computer architecture shown in FIG. 4 illustrates an architecture for a conventional desktop, laptop, or server computer and may be utilized to implement the computer 102 discussed above with respect to FIG. 1.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 104, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 418. The computer 400 may connect to the network 418 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 420 suitable for controlling the operation of a networked desktop, laptop, or server computer. The mass storage device 410 and RAM 414 may also store one or more program modules. In particular, the mass storage device 410 and the RAM 414 may store the data analysis add-in program 104 and the spreadsheet application program 106, each of which was described in detail above with respect to FIGS. 1-3. The RAM 414 also stores the column-oriented page cache 110 discussed in detail above. The mass storage device 410 and the RAM 414 may also store other types of program modules and data.

It should be appreciated that the software components described herein may, when loaded into the CPU 402 and executed, transform the CPU 402 and the overall computer 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the computer 400 may comprise other types of computing devices, including hand-held computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for column oriented in-memory page caching have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for column oriented in-memory page caching, the computer-implemented method comprising performing computer-implemented operations for:

receiving tabular data comprising a plurality of columns and a plurality of rows;

receiving a request to display a portion of the tabular data;

in response to receiving the request, allocating a one-dimensional array in a memory for each column of the tabular data requested to be displayed;

setting a data type of each of the one-dimensional arrays to be the same as a data type for a corresponding column of tabular data;

organizing each of the one-dimensional arrays into pages;

configuring the one-dimensional arrays to store all or a portion of the tabular data from a plurality of the rows of each column of the tabular data;

storing the data from the plurality of the rows of each column of the tabular data in the allocated one-dimensional arrays; and utilizing the data stored in the one-dimensional arrays to display the portion of the tabular data.

2. The computer-implemented method of claim 1, further comprising prior to allocating the one-dimensional arrays:

determining whether sufficient memory is available to allocate the one-dimensional arrays; and in response to determining that sufficient memory is not available to allocate the one-dimensional arrays, flushing one or more of the pages.

3. The computer-implemented method of claim 2, further comprising in response to determining that sufficient memory is available to allocate the one-dimensional arrays, allocating a one-dimensional array in the memory for each column of the tabular data.

4. The computer-implemented method of claim 3, wherein the tabular data is received from an in-process data analysis server.

5. The computer-implemented method of claim 4, wherein the in-process data analysis server executes in process with a spreadsheet application program.

6. The computer-implemented method of claim 5, wherein the memory comprises a random access memory (RAM).

7. The computer-implemented method of claim 1, further comprising allocating an additional one-dimensional array in the memory for a remaining portion of the rows of each column of the tabular data.

8. An optical disk, magnetic storage device, or solid state storage device having computer-readable instructions stored thereupon which, when executed by a computer, cause the computer to:

receive tabular data comprising a plurality of columns and a plurality of rows;

receive a request to display a portion of the tabular data;

in response to receiving the request, allocate a one-dimensional array in a random access memory (RAM) of the computer for a portion of the rows of each column of the tabular data requested to be displayed;

set a data type of each of the one-dimensional arrays to be the same as a data type for the corresponding column of tabular data;

organize the one-dimensional arrays into pages;

configure the one-dimensional arrays to store all or a portion of data from a plurality of the rows of each column of the tabular data;

store the data from the plurality of the rows of each column of the tabular data in the allocated one-dimensional arrays; and utilize the data stored in the one-dimensional arrays to display the portion of the tabular data requested to be displayed.

9. The optical disk, magnetic storage device, or solid state storage device of claim 8, having further computer-readable instructions stored thereupon which, when executed by the computer, cause the computer to determine whether sufficient memory is available to allocate the one-dimensional arrays and to flush one or more of the pages in response to determining that sufficient memory is not available prior.

10. The optical disk, magnetic storage device, or solid state storage device of claim 9, having further computer-readable instructions stored thereupon which, when executed by the computer, cause the computer to allocate the one-dimensional arrays in the memory for each column of the tabular data in response to determining that sufficient memory is available to allocate the one-dimensional arrays.

11. The optical disk, magnetic storage device, or solid state storage device of claim 10, wherein the tabular data is received from an in-process data analysis server.

12. The optical disk, magnetic storage device, or solid state storage device of claim 11, wherein the in-process data analysis server executes in process with a spreadsheet application program.

13. A computer, comprising:
a processor; and
a computer-readable storage medium in communication with the processor, the computer-readable storage medium having computer-readable instructions stored thereupon which, when executed by the processor, cause the processor to
receive tabular data comprising a plurality of columns and a plurality of rows from an in-process data analysis server,
receive a request to display a portion of the tabular data,
in response to receiving the request, allocate a one-dimensional array in a random access memory of the computer for a portion of the rows of each column of the tabular data,
set a data type of each of the one-dimensional arrays to be the same as a data type for the corresponding column of tabular data,
organize the one-dimensional arrays into pages,
configure the one-dimensional array to store all or a portion of data from a plurality of the rows of each column of the tabular data,
store the data from the plurality of the rows of each column of the tabular data in the allocated one-dimensional arrays, and
utilize the data stored in the one-dimensional arrays to display a portion of the tabular data.

14. The computer of claim 13, wherein the in-process data analysis server executes in process with a spreadsheet application program.

15. The computer of claim 13, having further computer-readable instructions stored thereupon which, when executed by the processor, cause the processor to determine whether sufficient memory is available to allocate the one-dimensional arrays and to flush one or more of the pages in response to determining that sufficient memory is not available prior.

16. The computer of claim 15, having further computer-readable instructions stored thereupon which, when executed by the processor, cause the processor to allocate the one-dimensional arrays in the memory for each column of the tabular data in response to determining that sufficient memory is available to allocate the one-dimensional arrays.

* * * * *